(12) United States Patent
Lee

(10) Patent No.: US 8,295,495 B1
(45) Date of Patent: Oct. 23, 2012

(54) SYSTEM AND METHOD FOR DETECTING RATED MAXIMUM SYSTEM DEVIATION (RMSD) AND ALLEVIATING RMSD MISMATCH

(75) Inventor: Chris Cheng-Chieh Lee, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 1242 days.

(21) Appl. No.: 11/871,773

(22) Filed: Oct. 12, 2007

Related U.S. Application Data

(60) Provisional application No. 60/829,202, filed on Oct. 12, 2006.

(51) Int. Cl.
| | |
|---|---|
| *H04H 40/81* | (2008.01) |
| *H04H 20/47* | (2008.01) |
| *H04H 20/88* | (2008.01) |
| *H04H 40/36* | (2008.01) |
| *H04H 40/54* | (2008.01) |
| *H04H 40/72* | (2008.01) |
| *H04B 1/10* | (2006.01) |
| *H04B 1/06* | (2006.01) |
| *H04B 7/00* | (2006.01) |
| *H04B 1/16* | (2006.01) |

(52) U.S. Cl. ........... 381/11; 381/2; 381/10; 381/13; 455/283; 455/296; 455/266; 455/337

(58) Field of Classification Search .......... 381/11, 381/12, 13, 10, 2, 3; 455/283, 296, 224, 455/266, 293, 337–339, 267, 234, 234.1, 455/234.2

See application file for complete search history.

(56) References Cited

U.S. PATENT DOCUMENTS

| | | | | |
|---|---|---|---|---|
| 4,703,501 | A | * 10/1987 | Sugai et al. | 381/10 |
| 5,097,221 | A | * 3/1992 | Miller | 329/318 |
| 5,526,284 | A | * 6/1996 | Mankovitz | 455/66.1 |

* cited by examiner

*Primary Examiner* — Vivian Chin
*Assistant Examiner* — Douglas Suthers

(57) ABSTRACT

An FM audio receiver can include a mono/stereo detector that causes the audio receiver to output either a monophonic or a stereophonic signal based on a received pilot tone energy. An accurate operation of the receiver, including but not limited to correct decoding of monophonic/stereophonic reception, can be based on the receiver operating with the same rated maximum system deviation (RMSD) as the received signal itself. Aspects of the disclosure describe a system and method of detecting and matching a receiver's RMSD to that of a received signal by demodulating a carrier bearing a an input signal over a first bandwidth, extracting a pilot energy signal from the input signal, and demodulating the carrier bearing the input signal over a second bandwidth if the pilot energy signal is within a pilot energy range for a first predetermined amount of time.

19 Claims, 10 Drawing Sheets

SYSTEM AND METHOD FOR DETECTING RATED MAXIMUM SYSTEM DEVIATION (RMSD) AND ALLEVIATING RMSD MISMATCH

INCORPORATION BY REFERENCE

This application claims the benefit of U.S. Provisional Application No. 60/829,202, "Method and Algorithm to Estimate the Channel Condition Based on Filtered Pilot Energy Signal" filed on Oct. 12, 2006, incorporated herein by reference in its entirety.

BACKGROUND

Receivers that detect stereophonic/monophonic signals can be incorporated into a vast number of devices used in everyday life. For example, such receivers can be used in automobile radios, a variety of communication systems such as cellular telephones, and even children's toys. Unfortunately, many modern receiver systems can suffer from performance shortfalls, such as frequent switchover between monophonic and stereophonic modes due to noisy channel environments and false detection of stereophonic signals as monophonic due to rated maximum system deviation (RMSD) mismatch.

In frequency modulated (FM) systems, an information signal (multiplex signal) modulates a frequency of a carrier that is transmitted over the airwaves. The carrier is a constant frequency signal that has a frequency high enough to be transmitted effectively. For FM systems specifically, as the information signal varies with time so does the instantaneous frequency of the modulated signal. In a complex baseband domain, the transmitted FM signal can be represented by the equation:

$$\exp\left(j2\pi F_\Delta \int_0^\tau mpx(\tau)\,d\tau\right)$$

where the information signal is the multiplex signal mpx(t).

A bandwidth of the modulated signal is represented by an RMSD value. In the above equation, the RMSD is represented by $F_\Delta$. Generally, two different RMSD values are accepted in standards governing FM transmission, 75 kHz and 50 kHz. A majority of transmitting standards require an RMSD value of 75 kHz, however, an RMSD value of 50 kHz is still being used by many broadcasters.

As a result of transmitted signals having an RMSD value of either 75 kHz and 50 kHz, a receiver may receive either. However, the receiver may be set to receive at a different RMSD value than the RMSD value of the transmitted signal. In this situation, the transmitted signal RMSD value and the RMSD value of the receiver are mismatched, and a stereophonic/monophonic state of the signal can be falsely interpreted by the receiver. This can result in the listener being denied the stereophonic quality of the program that the service provider is transmitting on the airwaves.

In order to receive FM audio signals, be they music or any other type of information, a receiver must be robust enough to handle changes in the channel caused by noise. Generally, a pilot tone is transmitted as part of the multiplex signal that is used to modulate an FM carrier signal in order to indicate that a transmission is stereophonic. The energy of the pilot tone may fluctuate significantly in a harsh channel scenario. Also, if a receiver is receiving at an RMSD value that is different than a transmitted RMSD value (i.e., the RMSD values are mismatched), then the received signal including the pilot tone can be distorted. Thus, simply comparing the pilot tone energy, estimated at the receiver, against a predetermined threshold may cause the receiver to switch between monophonic and stereophonic mode incorrectly or too frequently, and thereby degrade the entertainment quality of the audio program delivered to the consumer.

SUMMARY

Accurate deciphering of the monophonic/stereophonic mode of reception can heavily depend on the receiver operating with a correct rated maximum system deviation (RMSD) information. Generally, stereophonic FM transmission operates with one of two different RMSD values, 75 kHz and 50 kHz. When receiving a broadcast, a receiver generally does not know beforehand which of the two RMSD values are correct. An RMSD mismatch can occur when the receiver is set to operate at an RMSD value that is different from the RMSD value of the transmitted signal. More specifically, if the transmitted signal has an RMSD value of 75 kHz, while the receiver RMSD value is set to operate at 50 kHz, an RMSD mismatch occurs. Alternatively, if the transmitted signal has an RMSD value of 50 kHz, while the receiver RMSD value is set to operate at 75 kHz, again an RMSD mismatch occurs.

The present disclosure relates to a system and method for setting up an appropriate receiver operating mode that matches a received information signal characteristics by making a reliable estimate of the received energy of a pilot signal. The pilot signal is transmitted along with the information signal. The estimated pilot energy is compared to different predetermined energy threshold values. The logical outputs of the comparisons are used to determine whether the receiver is set to an appropriate receiver operating mode. Specifically, the proposed system and method may be utilized to match the receiver RMSD value to the RMSD value of the received signal in a frequency modulated (FM) stereophonic/monophonic reception of broadcast audio signals.

More specifically, aspects of the disclosure are directed to a technique of receiving a transmitted signal including demodulating a carrier bearing an input signal over a first bandwidth, extracting a pilot energy signal from the input signal, and demodulating the carrier bearing the input signal over a second bandwidth if the extracted pilot energy signal is within a pilot energy range for a first predetermined amount of time. The technique can further include demodulating the carrier bearing the input signal over the first bandwidth if the pilot energy signal is greater than a pilot energy threshold for a second predetermined amount of time. The first bandwidth can be an RMSD value of 75 kHz and the second bandwidth can be an RMSD value of 50 kHz.

The technique can also include filtering the pilot energy signal so that the input signal can be demodulated over the second bandwidth if the filtered pilot energy signal is within the pilot energy range for the first predetermined amount time.

Aspects of the disclosure can further include decoding the input signal as either a monophonic or stereophonic based on a residual signal that is indicative of a difference between the pilot energy signal and a filtered pilot energy signal.

Other aspects of the disclosure can further include comparing the residual signal energy with a noise energy threshold to generate a channel condition signal, and outputting either the monophonic or stereophonic signal based on the channel condition signal. The technique can further include comparing the pilot energy signal with a pilot energy threshold to generate an energy level signal, and outputting either the monophonic or stereophonic signal based on the energy level signal.

The technique can also include generating a residual signal indicative of a noise level associated with a pilot energy signal, calculating a residual block energy level of the residual energy signal over an observation interval, generating a monitor signal based on a number of times the pilot energy signal is less than a pilot energy threshold during the observation interval, and switching the mode of the receiver based on the residual block energy level and monitor signal.

Other aspects can include designating a portion of the residual signal within the observation interval as either a mono block or a stereo block based on the residual block energy level and the monitor signal and designating the portion as a mono block when the residual block energy level over the observation interval is greater than a residual block energy threshold, or the monitor signal is less than a mode switch threshold; otherwise, designating the portion as a stereo block.

Additional aspects can include switching the mode of the receiver from a monophonic mode to a stereophonic mode if a predetermined number of consecutive portions of the residual signal are designated as stereo blocks. In a similar manner, the mode of the receiver can be switched from a stereophonic mode to a monophonic mode if a predetermined number of consecutive portions of the residual signal are designated as mono blocks.

BRIEF DESCRIPTION OF THE DRAWINGS

Embodiments will be described with reference to the following drawings, wherein like numerals designate like elements, and wherein.

DETAILED DESCRIPTION OF EMBODIMENTS

Figure 1:
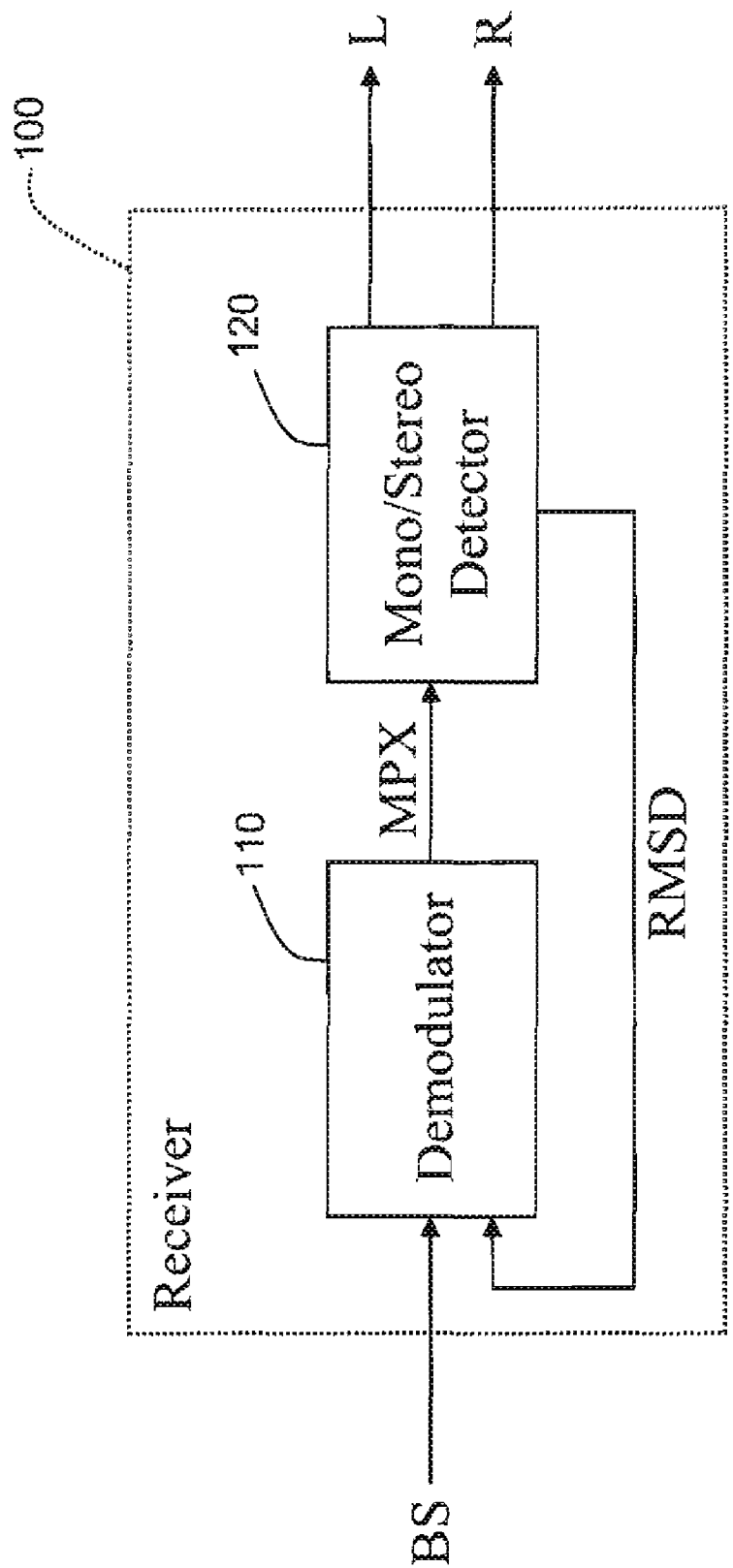
FIG. 1 shows a block diagram of an exemplary receiver incorporating a monophonic/stereophonic detector (MSD)

FIG. 1 shows a receiver 100 having a mono/stereo detector (MSD) 120 that is capable of robust and flexible detection of stereophonic signals L and R. The mono/stereo detector 120 receives an output of a demodulator 110, which receives a frequency modulated (FM) carrier signal BS from an antenna (not shown). Demodulator 110 demodulates BS into a multiplex signal MPX and then feeds MPX to a mono/stereo detector 120. Mono/stereo detector 120 processes MPX and outputs a left signal L and a right signal R, which may then be amplified by an amplifier (not shown) and used to drive a left and a right speaker (not shown), respectively. Depending on the presence and the state of a pilot tone component in the multiplex signal MPX, the mono/stereo detector 120 may output either left and right signals L and R in a stereophonic form or a monophonic form.

As shown in FIG. 1, the mono/stereo detector 120 can also generate and transmit an RMSD signal to the demodulator 110. The RMSD signal can be generated based on the pilot tone extracted from the MPX signal. For example, the extracted pilot tone can be compared with an expected level or range, and based on the outcome of that comparison, the RMSD signal can be transmitted by the MSD 120 to the demodulator 110, instructing the demodulator 110 to maintain the current RMSD value or change to a new RMSD value. In an embodiment, the RMSD signal can instruct the demodulator 110 to select an RMSD value. A bandwidth of the modulated signal can be represented by the RMSD value and can include, for example, 75 kHz or 50 kHz.

Figure 2:
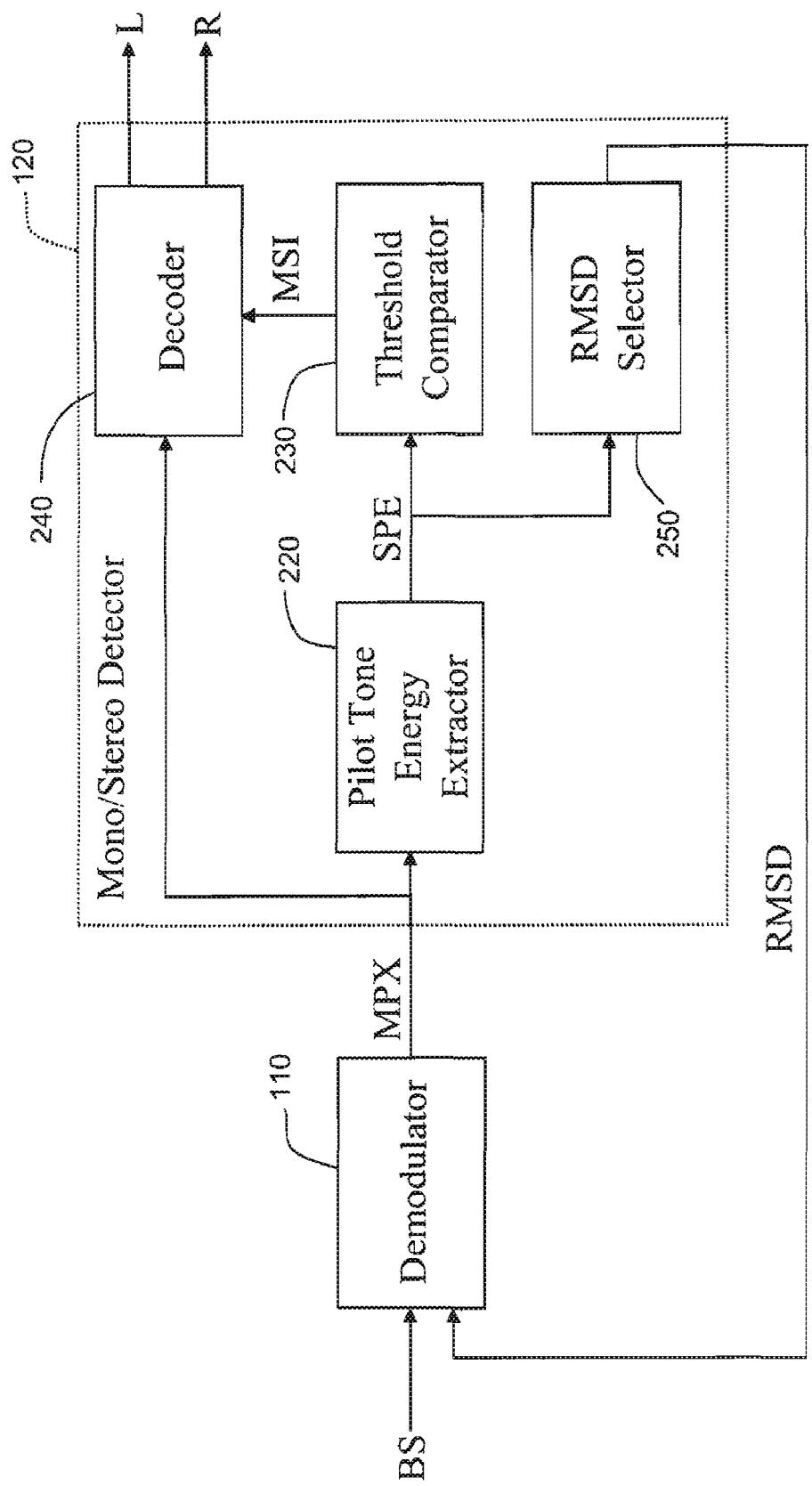
FIG. 2 shows a block diagram of an exemplary MSD shown in FIG. 1.

FIG. 2 shows a block diagram of a portion of the receiver 100 where the mono/stereo detector 120 is shown in greater detail. The mono/stereo detector 120 may include a pilot tone energy extractor 220, a threshold comparator 230, an RMSD selector 250 and a decoder 240, each of which are described in greater detail below.

The pilot tone energy extractor 220 can extract the pilot tone signal from the multiplexed signal MPX. Further, the pilot tone energy extractor 220 can generate pilot energy signal samples SPE from the pilot tone signal, which can be a measure of pilot energy per sample, such as audio samples. Subsequently, pilot energy signal samples SPE can be fed to the threshold comparator 230, which can compare SPE and the variants of it to several pre-set parameters (e.g., energy and noise thresholds) and can output a mono/stereo indicator signal MSI that can control the output of decoder 240. The pilot energy signal samples SPE can also be fed to RMSD selector 250. The RMSD selector 250 can filter the SPE to refine the pilot energy estimates and can utilize the refined estimates through various comparison operations and algorithms to generate an appropriate RMSD signal. The generated RMSD signal can be transmitted to demodulator 110 to allow the demodulator 110 to operate with a correct RMSD value.

The decoder 240 can utilize various filters and algorithms to extract left and right signals L and R from multiplex signal MPX as desired outputs by the receiver 100. However, whether left and right signals L and R are stereophonic or monophonic may depend on the signal MSI that the decoder 240 can receive from threshold comparator 230.

As described above, the threshold comparator 230 can examine the SPE to determine whether the receiver should operate in monophonic or stereophonic mode, and instruct the decoder 240 accordingly via MSI signal. Specifically, the threshold comparator 230 can receive the pilot energy signal samples SPE from the pilot tone energy extractor 220 and can compare each sample to a predetermined threshold. If the SPE value exceeds the threshold, it can imply that there is sufficient energy in the pilot tone signal to declare that pilot tone signal is actually present. Accordingly, the MSI signal can signify the nature of the transmission to be stereophonic.

Furthermore, the threshold comparator 230 can make the decision on the operating mode of the receiver based, not only on the received pilot energy, but also on the channel condition. A two step procedure can be followed. The first step involves estimating the energy of noise and interference and comparing it to a predefined threshold value. The second step involves estimating the pilot energy more accurately before it is compared to a threshold value. Further, the consistency of both the noise energy and pilot energy can be substantially improved by performing these estimations over a predetermined time duration, referred to as an observation interval.

For example, if the MSI signal indicates that the energy of the detected pilot tone signal is sufficient and the channel condition indicates that the noise is less than a predetermined threshold, the decoder 240 will output left and right signals L and R in stereophonic form. Whereas, if the MSI signal indicates that the energy of the detected pilot tone signal is either insufficient or the channel condition is too noisy as compared to the predetermined noise threshold, decoder 240 will output left and right signals L and R in monophonic form.

The RMSD selector 250 can receive the sample pilot energy signal SPE from the pilot tone energy extractor 220. The RMSD selector 250 can compare the pilot tone energy to predetermined thresholds or ranges that the receiver would expect to see if the receiver RMSD value were mismatched to the received signal RMSD value. For example, if the receiver RMSD value were 75 kHz and the received signal RMSD value were 50 kHz, then the RMSD selector 250 would detect a pilot tone energy that is distorted, such as scaled down. Therefore, the RMSD selector 250 would instruct the receiver to change its RMSD value to 50 kHz. In a similar manner, if the receiver RMSD value were 50 kHz and the received signal RMSD value were 75 kHz, then the RMSD selector 250 could detect a pilot tone energy that is again distorted, such as scaled up beyond a predetermined threshold. Therefore, the RMSD selector 250 could instruct the receiver to change its RMSD value to be 75 kHz.

Figure 3:
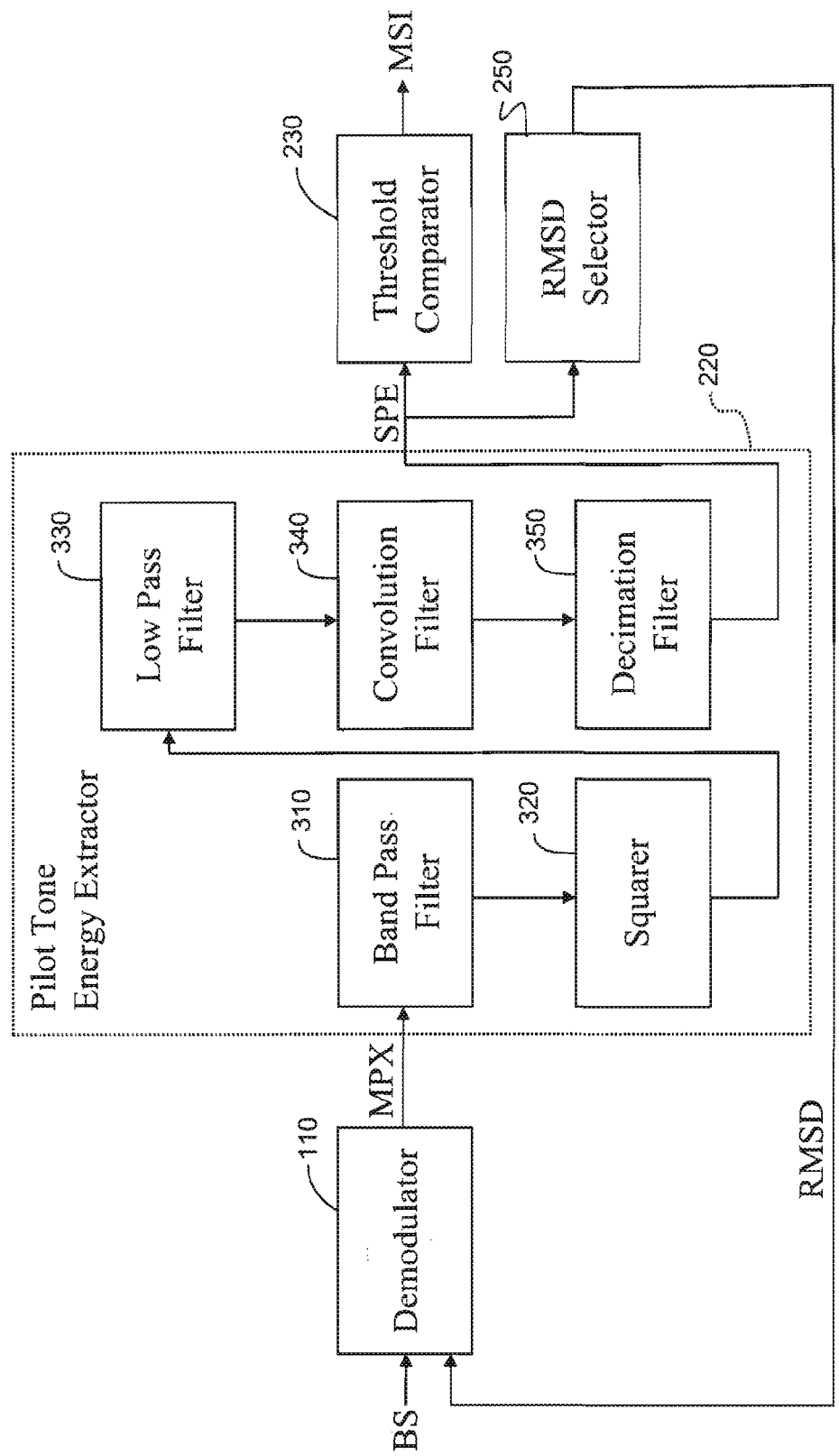
FIG. 3 shows a block diagram of an exemplary pilot tone energy extractor of FIG. 2.

FIG. 3 shows a block diagram of an exemplary pilot tone energy extractor 220 of FIG. 2. Pilot tone energy extractor 220 may include a band pass filter 310, a squarer 320, that multiplies the signal to itself, a low pass filter 330, a convolution filter 340, and a decimation filter 350.

The band pass filter 310 defines a predetermined shape of the frequency response over a band of frequency, such that its output is the appropriately shaped version of the MPX input. For example, in one embodiment, band pass filter 310 may be tuned to the 19 kHz pilot tone signal. The signal extracted from the squarer 320 mainly includes a DC component representing the pilot signal power and a second harmonic tone of 38 kHz along with residue of the channel noise and interference. Next, the low pass filter 330 outputs the DC component with the low pass filter shaped noise component. The convolution filter 340 accumulates or averages the signal over a predetermined and programmable time interval governed by $N_0$ samples, where $N_0$ is an integer>0.

100381 The decimation filter 350 outputs every $N_0^{th}$ sample of its input. As a combined processing entity, the convolution filter 340 along with the decimation filter 350, make up a window accumulator wherein the window defines a time duration such that the successive windows can be contiguous and at non-overlapping time intervals. The output of the decimation filter 350 are the pilot energy samples averaged over the window time duration of $N_0$ samples.

The signal samples output by decimation filter 350 are the sample pilot energy signal SPE which can be subsequently fed to threshold comparator 230 and to the RMSD selector 250. The SPE samples are further processed in the threshold comparator 230 and converted into the MSI signal for transmission to decoder 240. The SPE samples are also further processed in RMSD selector 250, such that the output of RMSD selector 250, referred to as RMSD signal, is fed to the demodulator 110. As described above, the RMSD signal input to the demodulator 110 causes the demodulator 110 to operate with an accurate value of RMSD.

Figure 4A:
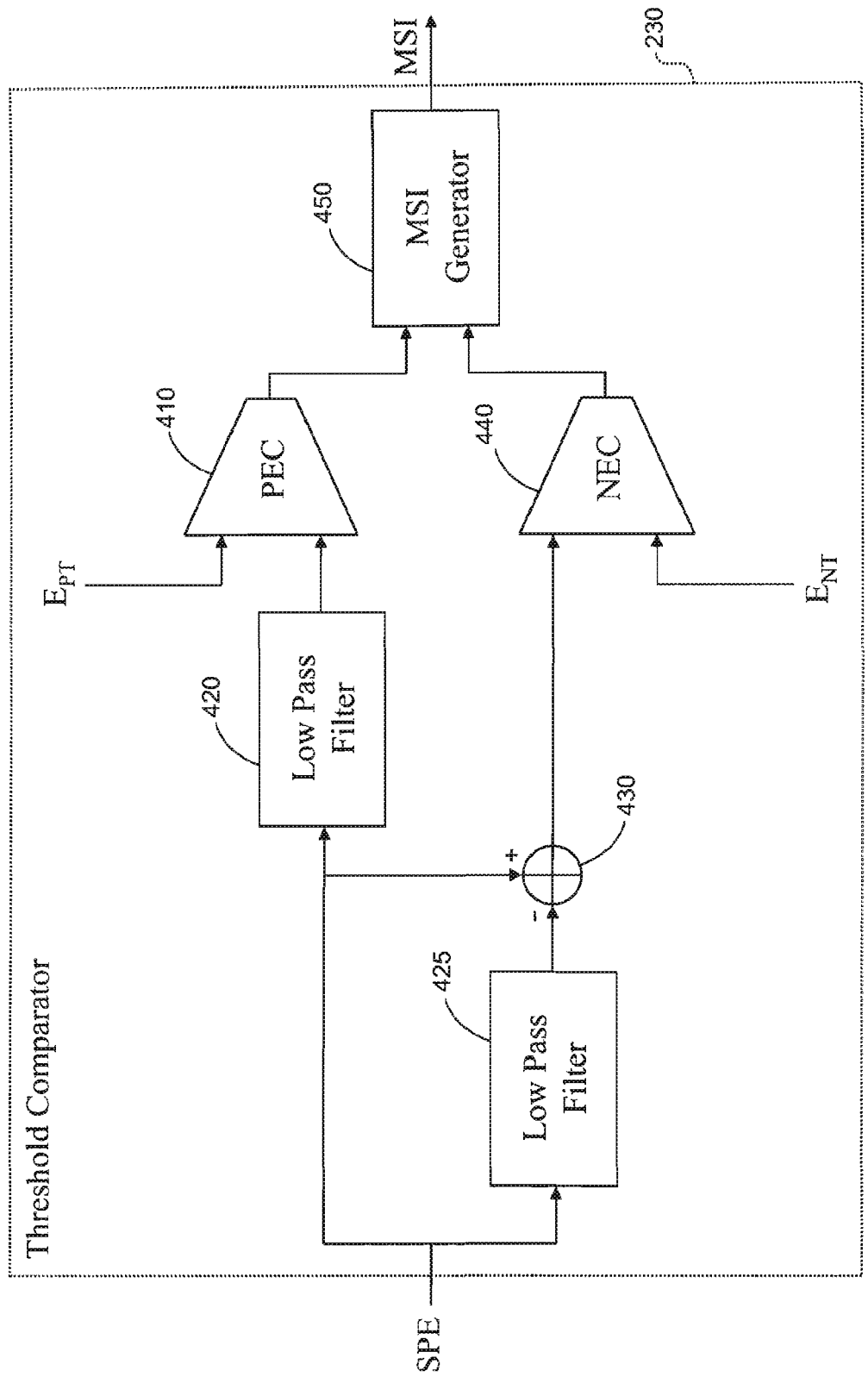
FIG. 4a shows an embodiment of a block diagram of an exemplary threshold comparator of FIG. 2.

FIG. 4a shows a block diagram of one embodiment of the threshold comparator 230 that processes and converts sample pilot energy signal SPE into the MSI signal. As shown, threshold comparator 230 can include pilot energy comparator (PEC) 410 for comparing a filtered pilot energy signal SPE with a predetermined pilot energy threshold $E_{PT}$, low pass filters 420 and 425 for filtering the sample pilot energy signal, a signal subtractor 430 for obtaining a residual signal, a noise energy comparator (NEC) 440 for comparing the noise energy of the residual signal with a predetermined noise energy threshold $E_{NT}$, and an MSI generator 450 for performing a logic function on the outputs of PEC 410 and NEC 440.

During operation, sample pilot energy signal SPE is received by threshold comparator 230 and then transmitted to low pass filter 420 and low pass filter 425. At low pass filters 420 and 425, sample pilot energy signal SPE is "smoothed" and transmitted to pilot energy comparator 410 and signal subtractor 430, respectively, as a smooth pilot energy signal. It should be appreciated that low pass filters 420 and 425 can be 1-tap IIR *filters*, or any other kind *of* low pass filters suitable for "*smoothing*" or reducing the noise level of sample pilot energy *signal* SPE. F*urthermore*, as will be described in greater detail *below*, low pass filters 420 and 425 may have a constant or a varying leakage factor ρ.

As the pilot energy comparator 410 receives the sample pilot energy signal SPE, it compares it with predetermined pilot energy threshold $E_{PT}$, and outputs a signal to MSI generator 450 indicating whether the sample pilot energy signal SPE has sufficient energy to be indicative of a reliable stereophonic signal. For example, if sample pilot energy SPE is below predetermined pilot energy threshold $E_{PT}$, then pilot energy comparator 410 can transmit a "mono-on" signal to MSI generator 450, indicating that receiver 100 should remain in or switch to monophonic mode. On the other hand, if sample pilot energy SPE is at or above predetermined pilot energy threshold $E_{PT}$, then pilot energy comparator 410 can transmit a "stereo-on" signal to MSI generator 450, indicating that receiver 100 should remain in or switch to stereophonic mode.

Low pass filter 425, signal subtractor 430, and noise energy comparator 440 collectively constitute a channel condition measurement stage, where the noise energy level of the sample pilot energy signal SPE is measured, and a signal is generated that indicates whether the noise energy is acceptable for stereophonic output by receiver 100. In particular, once sample pilot energy signal SPE is smoothed by low pass filter 425, it is transmitted to signal subtractor 430 where the difference between the smooth pilot energy signal and the original sample pilot energy signal SPE is calculated and transmitted as a residual signal to noise energy comparator 440.

The residual signal can be used to indicate the relative condition of the channel. For example, when the channel is clean, residual signal tends to be weak. Otherwise, when the channel is noisy, the residual signal tends to be strong and thus, has high energy. Noise energy comparator 440 computes a total energy of the residual signal in a given time block or interval (e.g., ~0.0232 seconds) of the base line signal with, for example, an L1-norm filter (not shown) that sums absolute values of the residual signal, and compares this energy with predetermined noise energy threshold $E_{NT}$. For example, if the total energy of the residual signal in the block is equal to or greater than that of noise energy threshold $E_{NT}$, then noise energy comparator 440 can transmit a "mono-on" signal to MSI generator 450. On the other hand, if the total energy of the residual signal of the block is less than that of noise energy threshold $E_{NT}$, then noise energy comparator 440 can transmit a "stereo-on" signal to MSI generator 450.

MSI generator 450 receives all or a portion of "mono-on" or "stereo-on" indicator signals from pilot energy comparator 410 and noise energy comparator 440, respectively, and performs a logic operation on the signals. MSI generator 450, for example, can be a logic gate that performs a logic AND operation, or the like. If either of the signals from PEC and NEC 410 and 440 is a "mono-on" signal, then MSI generator will output MSI signal instructing decoder 240 to remain in or switch to monophonic mode. MSI generator 450 will output MSI signal instructing decoder 240 to remain in or switch to stereophonic mode only when both output signals from PEC and NEC 410 and 440 are "stereo-on" signals.

Figure 4B:
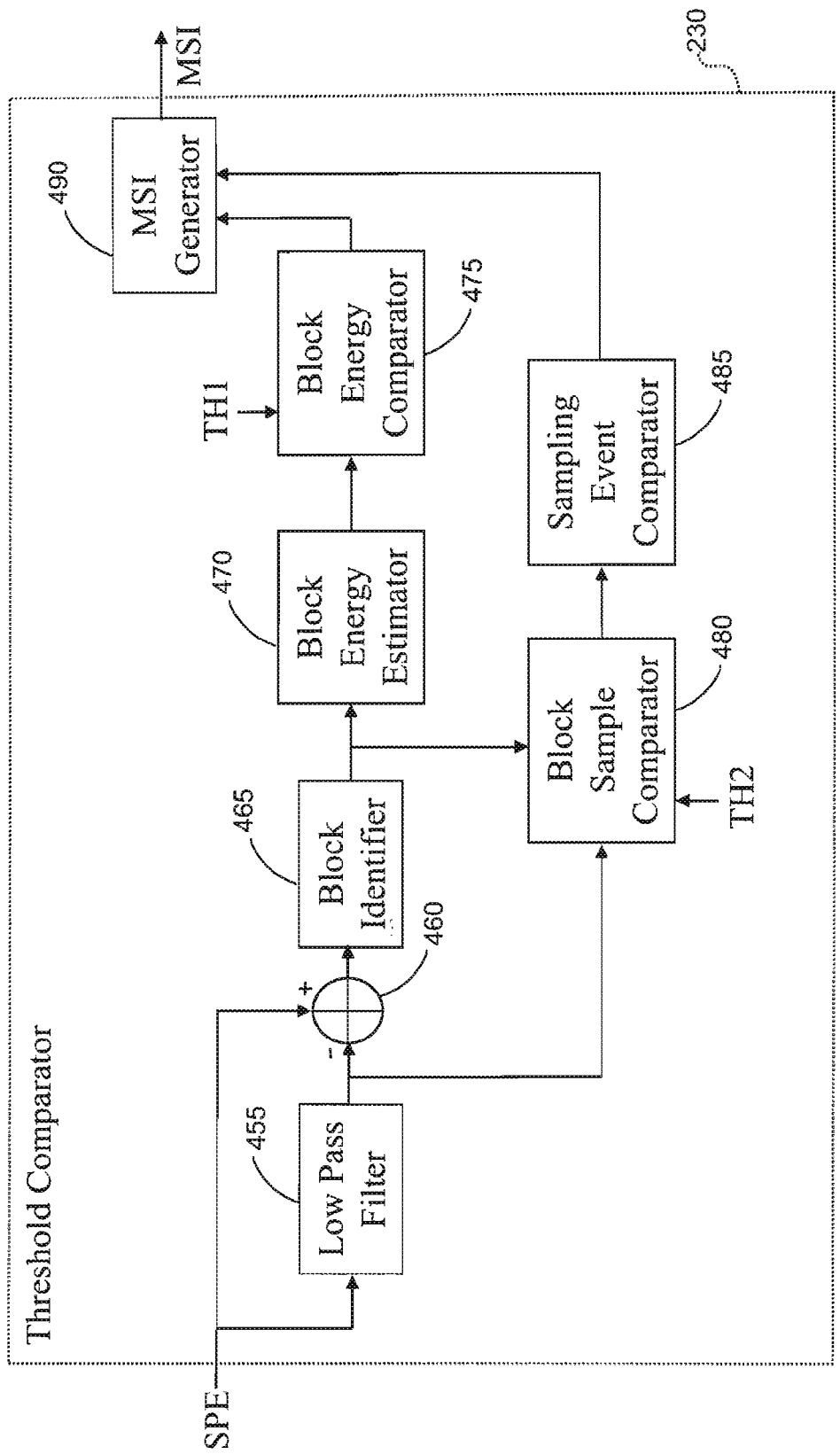
FIG. 4b shows another embodiment of a block diagram of an exemplary threshold comparator of FIG. 2.

FIG. 4b shows a block diagram of another embodiment of the threshold comparator 230 that processes sample pilot energy signal SPE to generate the MSI signal. As shown, the threshold comparator 230 can include a low pass filter 455 to reduce the noise/interference in SPE. Subsequently, a subtractor 460 can subtract the low pass filtered version of the SPE from itself to generate a difference signal that is referred to as the residual signal. A block identifier 465 identifies an observation interval that can include a pre-defined set of samples that are from the output of the low pass filtered SPE signal. Also included may be a block energy estimator 470, that calculates the energy of the residual signal over the observation interval, followed by a block energy comparator 475, that compares the aforementioned energy of the residual signal against a predetermined threshold value TH1 and outputs a channel condition signal. A block sample comparator 480 calculates how many times the low pass filtered sample pilot energy signal SPE exceeds a predetermined threshold value TH2 over an observation interval, which is referred to as a sample number. Subsequently, the sampling event comparator 485 checks if the sample number available at the output of the block sample comparator 480 exceeds a predetermined threshold and outputs a pilot energy status signal.

The MSI generator 490 receives the channel condition signal and the pilot energy status signal, and makes a decision as to whether at any time the receiver should be operating in a monophonic mode or a stereophonic mode. For example, the MSI generator 490 can determine whether the channel condition signal and the pilot energy status signal maintain particular values for a certain time interval or number of observation intervals to warrant a particular mode of operation. The MSI generator 490 also decides if the receiver operating mode needs to be changed from monophonic to stereophonic or vice versa. The MSI generator 490 outputs an MSI signal representative of the appropriate receiver operating mode.

During operation, pilot signal energy samples SPE are input to the threshold comparator 230 and processed by the low pass filter 455. It should be appreciated that low pass filter 455 can be a 1-tap IIR filter, or any other kind of low pass filters suitable for "smoothing" or reducing the noise level of sample pilot energy signal SPE.

At the output of the low pass filter 455, sample pilot energy signal SPE is "smoothed" which can result in a better estimate of the pilot energy. The low pass filter 455 can be followed by a subtractor 460 that subtracts the "smoothed out SPE" from the SPE itself. The difference samples that are the output of the subtractor 460 are referred to as the residual signal. The residual signal can be thought of as representing the samples of the composite of the noise and interference in SPE. Subsequently, a determination can be made to see if the channel condition is too noisy by comparing energy of the residual signal over an observation interval with a predetermined residual block energy threshold. Additionally, a determination can be made to see if the pilot tone energy is inadequate. The mode of the receiver can then be switched based on the outcome.

The observation interval can be defined by a block of N samples of the smoothed out pilot energy samples which are the outputs of the low pass filter 455. Each block of N samples, in one embodiment, may be defined in a way that each successive block is contiguous to the previous, as well as the next block, but there is no overlap of samples from one block to the immediately previous or immediately subsequent block. However, it should be understood that there may be other embodiments that may have blocks that are disjointed or even parts of a block that include samples that are non-contiguous. The task of collecting the samples together to form successive blocks can be done by the block identifier 465.

As described above, the channel condition can be determined to be either good or noisy. This can be accomplished by generating a residual signal as a difference between the pilot energy signal and the filtered pilot energy signal by subtractor 460. Residual block energy can be determined over an observation interval by accumulating the residual energy samples over the observation interval. Subsequently, the residual block energy can be compared to a predetermined residual block energy threshold. If the determined residual block energy is greater than the threshold, then the channel is designated as noisy. Alternatively, if the residual block energy exceeds the threshold, then the channel is designated as good. The energy of the residual signal over the observation interval can be estimated by accumulating the residual sample values corresponding to those samples that constitute a block. The accumulation may be performed by the block energy estimator 470 of FIG. 4b. Subsequently, the energy estimate over the block is compared to a value Th1 by the block energy comparator 475. If the energy estimate is more than Th1 the channel is determined to be noisy.

As also described above, the pilot energy can be determined to be either adequate or inadequate. This can be accomplished by determining whether a sample number of the smoothed out pilot energy samples, obtained after the low pass filter 455 are less than a pilot energy threshold, for the block. The received pilot energy is deemed to be inadequate if the sample number exceeds a pilot energy threshold. Alternatively, if the sample number does not exceed the pilot energy threshold, then the pilot energy is deemed to be adequate.

The determination that the received pilot signal is weak enough for the block under consideration to be deemed as monophonic can, be done by a three step process. First, the smoothed out pilot energy estimate is compared to a value TH2 by the block sample comparator 480. The next step is performed by the sampling event comparator 485 that counts the number of times the estimated energy value is less than TH2 over a specific block, referred to as a sample count. The final step is also performed by the sampling event comparator 485 that checks if the sample count is more than an integer TH3 and, if that is true, it is determined that the received pilot energy signal is not strong enough.

If either of two conditions is satisfied, that of the channel being noisy and the pilot signal energy being inadequate, the concerned block is designated as monophonic. But if none of these two conditions is satisfied, the concerned block is designated as stereophonic. In order to avoid rapid switching between the two receiver modes, switching between modes can be delayed until a predetermined number of consecutive blocks, either mono or stereo, are determined to be the same after a judicious length of observation. Hence, if the receiver is in monophonic mode, the MSI generator 490 would only change the receiver's mode to stereophonic if the number of consecutive blocks identified as stereophonic exceeds the predetermined number. Similarly, if the receiver is in stereophonic mode, the MSI generator 490 would only change the receiver's mode to monophonic if the number of consecutive blocks being monophonic exceeds another or the same predetermined number.

The MSI generator 490 keeps track of the status of the blocks to determine whether the receiver should switch modes. Once the MSI generator 490 decides that a mode of the receiver should be switched, the MSI generator 490 can signal the decoder 240 to switch modes via the MSI signal.

For example, if the MSI signal indicates that the energy of the detected pilot tone signal is sufficient and the channel condition indicates that the noise is less than a predetermined threshold, the decoder 240 will output left and right signals L and R in stereophonic form. Whereas, if the MSI signal indicates that the energy of the detected pilot tone signal is either insufficient or the channel condition is too noisy as compared to the predetermined noise threshold, decoder 240 will output left and right signals L and R in monophonic form. Hence, a robust, reliable and flexible detection of stereophonic signals can be achieved.

Figure 5:
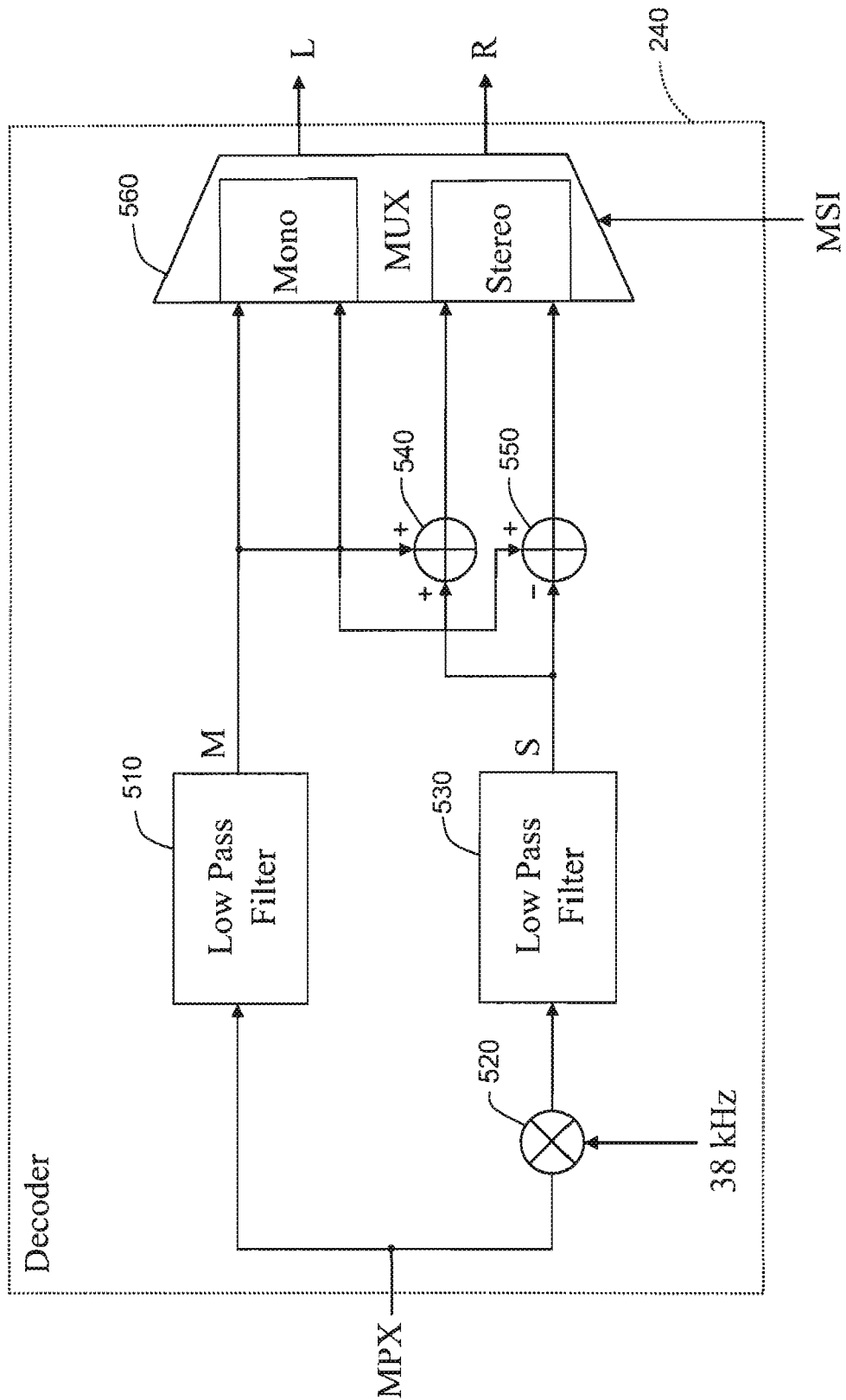
FIG. 5 shows a block diagram of an exemplary decoder of FIG. 2.

FIG. 5 shows decoder 240 that decodes multiplex signal MPX into left and right signals L and R. Decoder 240 may include two low pass filters 510 and 530, a signal multiplier 520, a signal adder 540, a signal subtractor 550, and a multiplexer (MUX) 560.

In the exemplary decoder 240, the multiplex signal MPX is processed along two signal paths. The first path is through the low pass filter 510 that isolates a sum signal M, which contains half of the sum of left and right signals L and R. The second signal path includes the signal multiplier 520 that mixes the multiplex signal MPX by a 38 kHz auxiliary carrier (obtained, for example, from the 19 kHz pilot tone), and a low pass filter 530. Together, the signal multiplier 520 along with low pass filter 530 demodulate the component of the MPX signal to extract the difference signal S, which contains the difference between the left and right signals L and R. Subsequently, M and S signals are summed and subtracted by signal adder 540 and signal subtractor 550, respectively, and transmitted to a stereo input section (Stereo) of multiplexer 560. Furthermore, the signal M is transmitted to a mono input section (Mono) of multiplexer 560. Multiplexer 560 also receives the MSI signal, based on which it selects either the stereo signals or the mono signals for output on the L and R channels.

Figure 6:
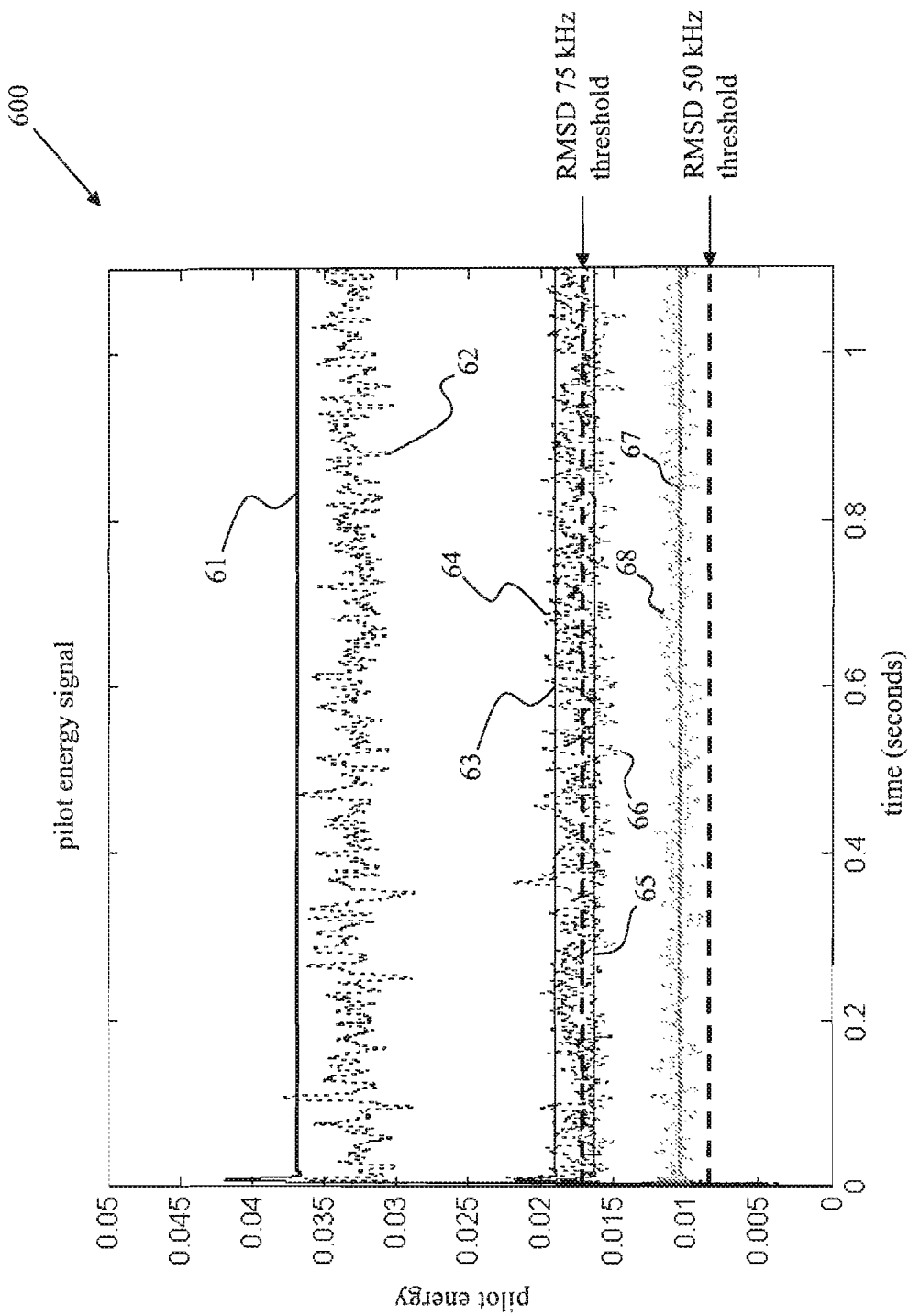
FIG. 6 shows a plot of a monitored unfiltered pilot energy signal for noiseless and noisy channel scenario of RMSD of 75 kHz and 50 kHz, respectively.
Figure 7:
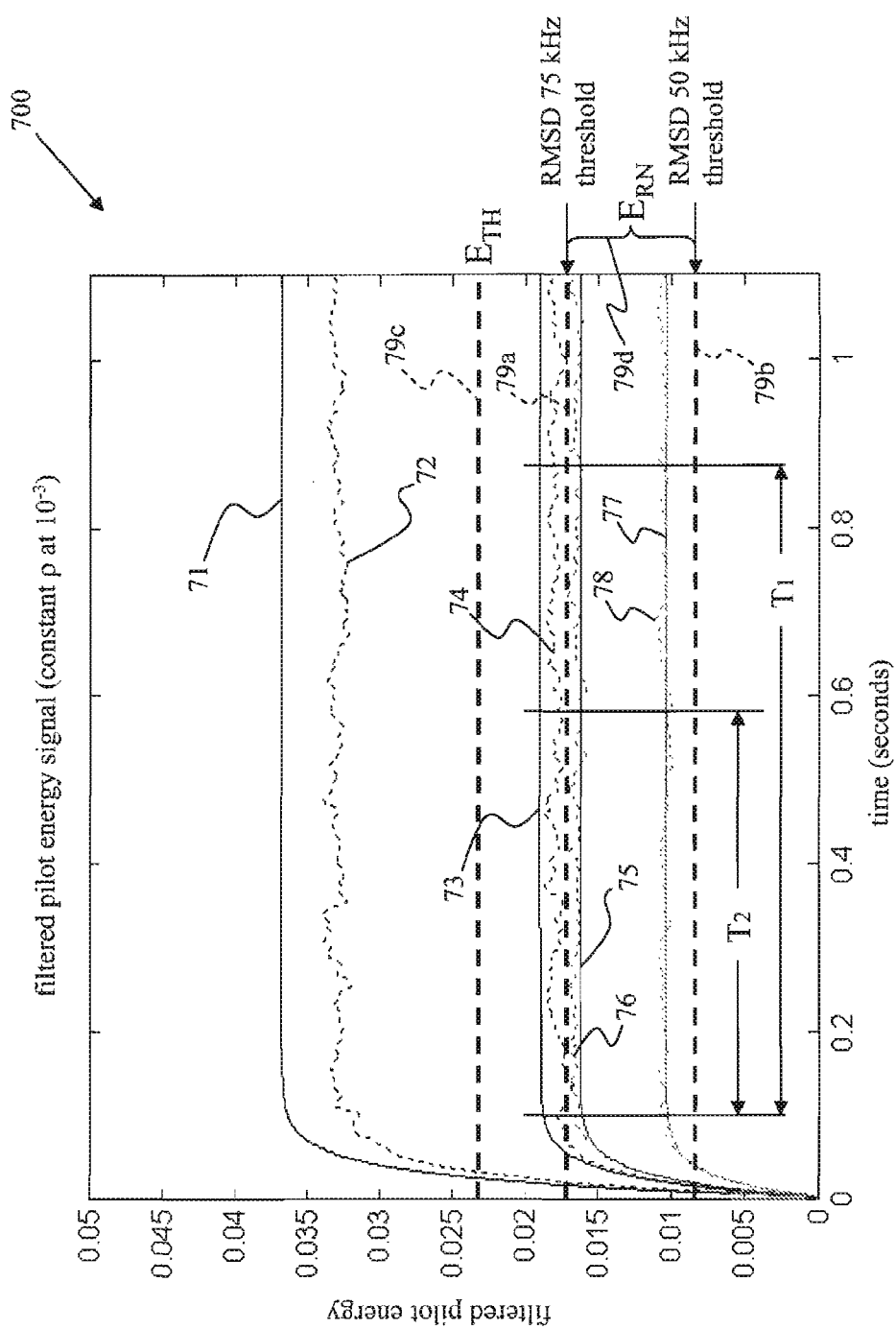
FIG. 7 shows a plot of a monitored filtered pilot energy signal using a constant leakage factor ρ for the same scenarios as that for FIG. 6.

FIGS. 6 and 7 show diagrams 600 and 700, respectively, that illustrate results of simulations for unfiltered and filtered pilot energy signals in both clean and noisy channel environments.

FIG. 6 shows a diagram 600 that illustrates results of a simulation for an unfiltered pilot energy signal similar to signal SPE described in FIG. 3. This simulation illustrates how various pilot energy signals fluctuate without being smoothed by any filter processing.

The simulations were performed for the following signals: RMSD of 75 kHz with a clean pilot energy signal 61 at 10% of full scale; RMSD of 75 kHz with a noisy pilot energy signal 62 at 10% of full scale; RMSD of 75 kHz with a clean pilot energy signal 63 at 7.2% of full scale; RMSD of 75 kHz with a noisy pilot energy signal 64 at 7.2% of full scale; RMSD of 50 kHz with a clean pilot energy signal 65 at 10% of full scale; RMSD of 50 kHz with a noisy pilot energy signal 66 at 10% of full scale; RMSD of 50 kHz with a clean pilot energy signal 67 at 8% of full scale; and RMSD of 50 kHz with a noisy pilot energy signal 68 at 8% of full scale. RMSD 50 kHz and 75 kHz signal thresholds are delineated by the labeled thick dashed lines.

As shown in FIG. 6, unfiltered clean pilot energy signals 61, 63, 65, and 67 are flat and do not fluctuate. However, the unfiltered noisy pilot energy signals 62, 64, 66, and 68 can fluctuate wildly. Nonetheless, a response time for all of these signals is almost zero. That is, after the receiver is reset or a new radio station is selected (time=0 seconds), the pilot signals spike to their respective energy levels almost instantaneously. Without a low pass filter, such response times are possible, but with a significant throughput of noise, which can cause the receiver to switch from monophonic to stereophonic mode and vice versa too frequently when comparing the pilot tone energy against a predetermined threshold.

FIG. 7 shows a diagram 700 that illustrates results of a simulation for a filtered pilot energy signal similar to smooth pilot energy signal SPE described in FIG. 3. This simulation illustrates the performance of various pilot energy signals after being smoothed by a low pass filter with a constant leakage factor $\rho$. Although a low pass filter with a constant leakage factor $\rho$ is used in the simulations, it should be appreciated that any filter with any transfer function that is appropriate for the purpose described herein may be used to filter the pilot energy signal. Further, it should be understood that characteristics of such filter, such as the leakage factor $\rho$, can be varied over time to achieve a more desirable filtered pilot energy signal.

The simulations were performed for the same clean and noisy pilot energy signals as that of FIG. 6, but only after being filtered by a low pass filter with a leakage factor $\rho$ of $10^{-3}$. These pilot energy signals are indicated by reference numerals 71-78.

As shown in FIG. 7, filtered clean pilot energy signals 71, 73, 75, and 77 remain flat, and filtered noisy pilot energy signals 72, 74, 76, and 78 are much less noisy compared to the unfiltered pilot energy signals 62, 64, 66, and 68. However, filtering the pilot energy signals using a low pass filter with a leakage factor $\rho$ introduces a significant response time lag. The pilot energy signals ramp up to their respective energy levels only after approximately 0.1 seconds. This time lag can be alleviated by utilizing a low pass filter with a varying leakage factor $\rho$.

FIGS. 6 and 7 show signal levels that indicate the thresholds of pilot energy corresponding to RMSD of 75 kHz and 50 kHz respectively. The threshold of pilot energy corresponding to the RMSD 75 kHz 79a has been set at level slightly lower than the pilot signal energy output corresponding to pilot energy being 7.2%, the lowest possible level. Similarly, the threshold of pilot energy corresponding to the RMDS 50 kHz 79b has been set at level slightly lower than the pilot signal energy output corresponding to pilot energy being 8%, the lowest possible level. However, in case of RMSD mismatch the thresholds can be distorted.

Referring to FIG. 7, in one scenario, if the receiver RMSD is 75 kHz while received signal RMSD value is 50 kHz, the threshold may be set at RMSD 75 kHz threshold 79a, but, as a result of the RMSD mismatch, the largest pilot energy that may be received would only be at most pilot energy signal 75. So even if the transmission has a stereophonic pilot tone present in multiplex signal, because the threshold level is at 79a, the received pilot energy is detected to be inadequate, and the transmission may be erroneously deemed to be monophonic. In another scenario, if the receiver RMSD value is 50 kHz while received signal RMSD value is 75 kHz, the threshold may be set at RMSD 50 kHz threshold 79b, but, as a result of the RMSD mismatch, the pilot energy that may be received would be somewhere between filtered pilot energy signals 73 and 71. One consequence of such a situation may be that there may be an overflow in the receiver system. Another consequence of such a situation may be that even in the absence of pilot tone which corresponds to an actually monophonic transmission, the receiver may incorrectly deem the transmission to be stereophonic because the threshold set by the receiver at 79b is relatively so low that there may be a heightened possibility of existence of a spurious signal making the received pilot energy exceed the threshold. So even if the transmission is monophonic in nature, because the threshold level 79b is relatively too low, the received pilot energy may be detected to be adequate, and hence the transmission may be erroneously deemed to be stereophonic.

In order to overcome the erroneous detection of pilot tone energy, an initial receiver RMSD value of 75 kHz can be set in view of the fact the actual RMSD value of the received signal is not known at the receiver. Subsequently, the smoothed out received pilot energy can be examined to determine whether it lies within a pilot energy range, defined between the two thresholds 79a and 79b for a predetermined length of time T2. The range of the threshold values lying between 79a and 79b is labeled as $E_{RN}$ 79d. If the smoothed out received pilot energy lies in between the two thresholds 79a and 79b, for a predetermined length of time T2, it may be concluded that the actual transmission is at an RMSD value of 50 kHz. The time duration T2 may be selected to be long enough so that it may be made sure that the condition is not met because of a spurious signal.

Alternatively, if the receiver is operating in the mode of RMSD being 50 kHz, the received smoothed out pilot energy may be estimated to be causing an overflow in the receiver for a predetermined length of time T1. An overflow condition may be established if the smoothed out received pilot energy exceeds the value $E_{TH}$ 79c. To accomplish this, the smoothed out pilot energy can be examined to determine whether it exceeds a pilot energy threshold, defined by 79c, over a predetermined amount of time T1. If that is so, it may be concluded that the actual transmission is 75 kHz. The time duration T1 may be selected to be long enough so that it may be made sure that the condition is not met by a spurious signal. The aforementioned two time durations T1 and T2 may be set independently with no bearing on each other.

Figure 8:
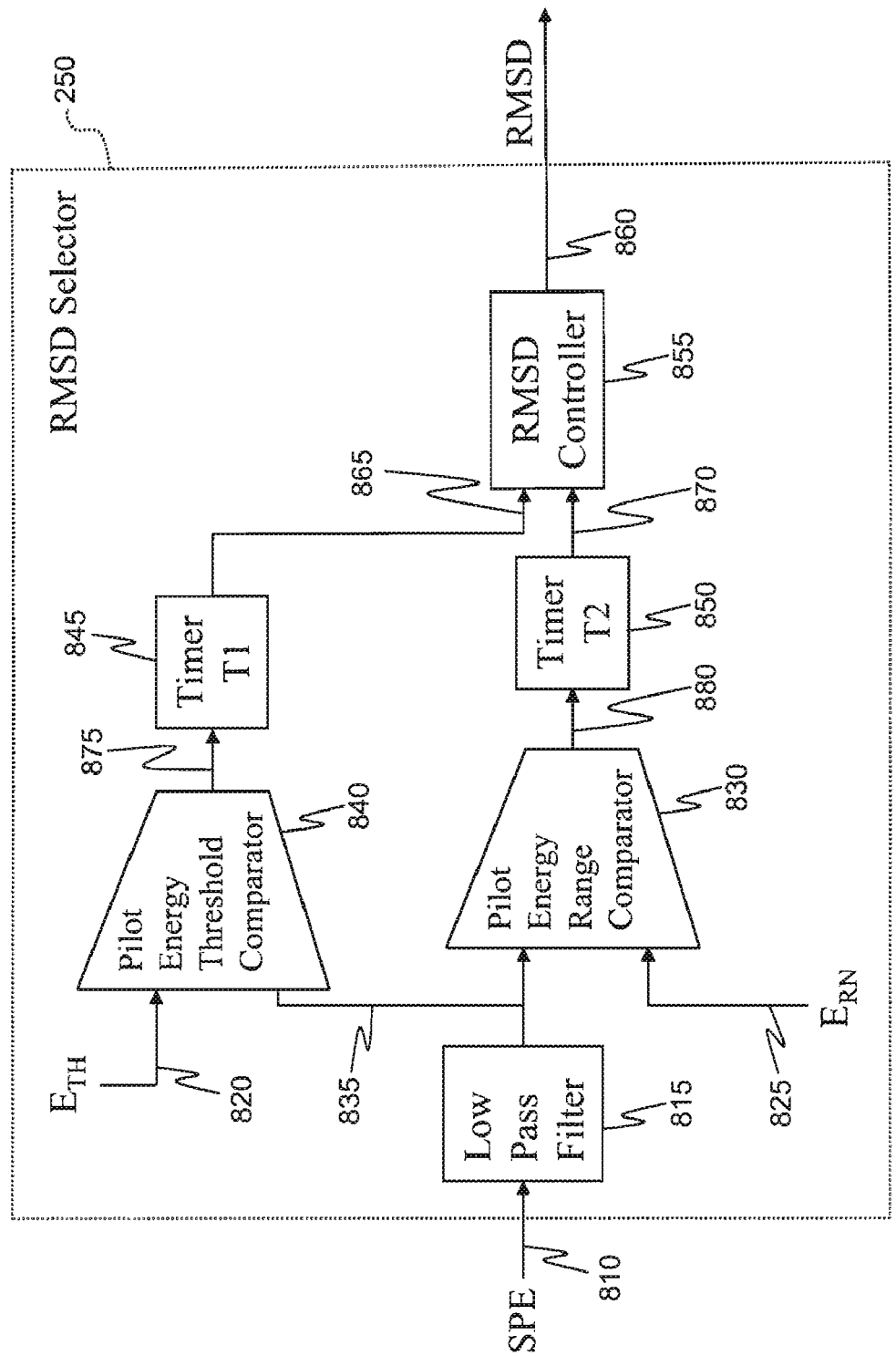
FIG. 8 shows a block diagram of an exemplary RMSD selector of FIG. 2 and FIG. 3 respectively.

FIG. 8 shows a block diagram of an exemplary RMSD selector 250. As described above, the RMSD selector 250 can process sample pilot energy signal SPE 810 to generate the RMSD signal 860 that is input to the demodulator 110.

As shown, the RMSD selector 250 can include a low pass filter 815 that filters the sample pilot energy signal SPE and outputs the filtered or "smoothed" energy samples 835 to both the pilot energy threshold comparator 840 and pilot energy range comparator 830. The pilot energy threshold comparator 840 can compare the filtered energy samples 835 to a predetermined energy threshold $E_{TH}$. The pilot energy range comparator 830 can determine whether the filtered energy samples 835 fall within a. range of energy values specified by a predetermined energy range $E_{RN}$ 825.

The output 875 of the pilot energy threshold comparator 840 is input to a timer 845 which has a predetermined time parameter T1. The output 880 of the pilot energy range comparator 830 similarly is input to a timer 850 which has a predetermined time parameter T2. While shown as separate timers T1 and T2, it should be understood that a single timer could also be used which could time a duration of outputs 875 and 880 over a same or different time interval.

The outputs of the timer 845 and the timer 850 are signals 865 and 870, respectively. The outputs 865 and 870 are fed to the RMSD controller 855. The RMSD controller 855 can determine whether the filtered pilot energy samples remain above the pilot energy threshold $E_{TH}$ for a first period of time T1, or between the pilot energy range $E_{RN}$ for a second period of time T2. If either of the two conditions is satisfied, then the RMSD selector 250 can transmit the RMSD signal 860 to cause the demodulator 110 to adjust an RMSD value.

For example, an appropriate value of input 865 initiates the receiver mode change in RMSD from 50 kHz to 75 kHz. Alternatively, an appropriate value of input 870 initiates the receiver mode change from 75 kHz to 50 kHz. Further, while the receiver is operating in a mode of RMSD at 75 kHz only the input 870 to the RMSD controller 855 is significant, the other input 865 is overlooked. Alternately, while the receiver is operating in a mode of RMSD at 50 kHz only the input 865 to the RMSD controller 855 is significant, the other input 870 is overlooked.

The low pass filter 815 is utilized to reduce the noise/interference in SPE. Sample pilot energy signal SPE is "smoothed" by the low pass filter 815 and can be input to pilot energy range comparator 830 and pilot energy threshold comparator 840, respectively, as the smoothed pilot energy signal. It is worth mentioning here that the low pass filter 815, as well as the low pass filter 455 in FIG. 4b, can be of any type that suit the purpose of smoothing the pilot energy samples.

Low pass filters 815 and 455 can be of similar nature or they could also be different. It should be appreciated that low pass filters 815 and 455 can be 1-tap IIR filters, or any other kind of low pass filters suitable for "smoothing" or reducing the noise level of sample pilot energy signal SPE. In one embodiment of the low pass filter, it can have following transfer function H(z) where p is the leakage factor and z is a delay factor.

$$H(z) = \frac{\rho}{1 - (1 - \rho)z^{-1}}$$

Further, it should be understood that characteristics of such filters, such as the leakage factor ρ, can be varied over time to achieve a more desirable filtered pilot energy signal. In one embodiment, the leakage factor at the beginning of the operation can be $2^{-4}$ and that can be decreased from $2^{4}$ to $2^{-12}$ in an appropriate manner. For example, the leakage factor ρ can be gradually decreased from $2^{-4}$ to $2^{-12}$ using any technique and can be implemented using hardware, software or any combination of both. The leakage factor ρ in the above examples are selected to be a power of two so that, if implemented digitally, the arithmetic operation done with them can be very simple. The larger initial value of the leakage factor ρ helps the filter output to converge fast, but as a tradeoff the output has a larger variance which implies that the filtered output is noisy. Reducing the leakage factor ρ later on to a smaller value makes sure that although the filter output convergence is slowed down, the output has a smaller variance which implies that the filter output is less noisy and the output is better "smoothed out."

During operation, an embodiment of the RMSD controller 855 can initially set an RMSD value of the receiver at 75 kHz. This RMSD value can be selected as an initial default value because the receiver may not be aware beforehand of the actual RMSD value of the received signal and statistically the RMSD value is more likely to be 75 kHz. The pilot energy range comparator 830 and timer 850 can monitor the sample pilot energy signal SPE and signal to the RMSD controller 855 to change the RMSD value of the receiver from 75 kHz to 50 kHz, if the sample pilot energy signal remains in the pilot energy range $E_{RN}$ for a period of time T2. The range $E_{RN}$ can encompass a range of energy values that have a lower limit $E_L$ and an upper limit $E_H$. The pilot energy range comparator 830 outputs an active signal 880 if the output sample of the low pass filter 835 is in the range $E_{RN}$. The output of the pilot energy range comparator 830 can be input to the timer 850 that can track the output 880 of the pilot energy range comparator 830 over time. For example, if the output of the low pass filter 815 is in the energy range $E_{RN}$ for time T2, the output of timer 850 can inform RMSD controller 855 that RMSD controller 855 should change the RMSD value of the demodulator 110 from 50 kHz to 75 kHz.

By a similar process, the pilot energy threshold comparator 840 and timer 845 can cause the RMSD value of the receiver to change from 50 kHz to 75 kHz. The low pass filter 815 can be followed by the pilot energy threshold comparator 840, that compares the filtered pilot energy signal SPE against a predetermined threshold value $E_{TH}$ 820. The output 875 of the pilot energy threshold comparator 840 can be input to the timer 845 which has a predetermined length of T1. The timer 845 can track the output 875 of the pilot energy threshold comparator 840 over time T1. For example, if the output 835 of the low pass filter 815 is larger than the threshold $E_{TH}$ for time T1, the timer 845 can inform RMSD controller 855 that RMSD controller 855 should change the RMSD value of the demodulator 110 from 50 kHz to 75 kHz.

Figure 9:
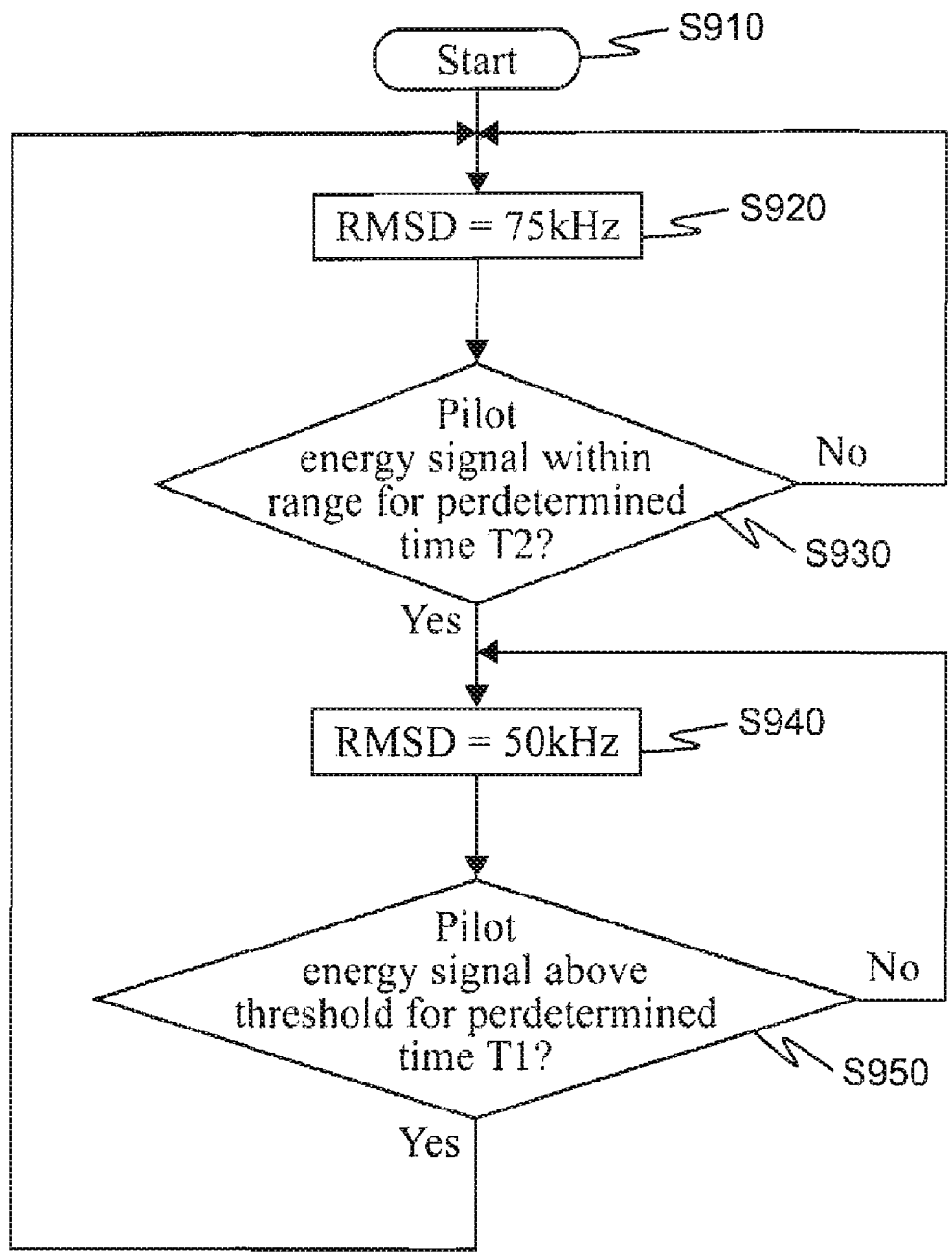
FIG. 9 shows an exemplary flowchart of a process of selecting an appropriate RMSD value using a pilot signal energy estimate over appropriate observation interval.

FIG. 9 is a flowchart showing an exemplary process of determining an appropriate RMSD mode of a receiver. The process begins at step S910 and proceeds to step S920.

At step S920, an RMSD value of a receiver is initially set at 75 kHz. As noted above, the initial setting of the RMSD value can be 75 kHz even though a received signal may have a value other than 75 kHz, because the RMSD value of the received signal may not be known beforehand. Additionally, because the majority of transmitted signals tend to have an RMSD value of 75 kHz, there can be a high probability that the received signal will indeed have an RMSD value of 75 kHz. The process can then proceed to step S930.

In step S930, a decision is made as to whether a pilot energy signal is within a predetermined range for a predetermined amount of time T2. As described above, a value of the pilot energy signal may be tracked to see if it is within a predetermined energy range, and whether the pilot energy signal remains within that range for a predetermined period of time. If the pilot energy signal is within that range for the predetermined period of time, the process proceeds to step S940; otherwise, the process returns to step S920, and the RMSD value for the receiver remains set at 75 kHz.

In step S940, the RMSD value for the receiver is set to be 50 kHz. The process then proceeds to step S950.

In step S950, a determination is made as to whether the pilot energy signal is above a threshold for a predetermined period of time TI. As described above, a pilot energy signal can be monitored to see if its value exceeds a predetermined threshold, and the time that the value of the pilot energy signal exceeds that threshold can be monitored. If the pilot energy signal is above the threshold for the predetermined time TI, then the process returns to step S920; otherwise, the process returns to step S940, where the RMSD value of the receiver remains at 50 kHz.

In step S920, the RMSD value for the receiver is set to 75 kHz, and the process proceeds as already described above.

Furthermore, it should be appreciated that mono/stereo detector MSD can detect pilot energy signals of stereophonic broadcasts at both 50 kHz and 75 kHz rated maximum system deviation RMSD. The pilot energy threshold $E_{TH}$ that is set to move from operating mode of RMSD value of 50 kHz to 75 kHz can refer to the case of signal overflow, wherein the smoothed out pilot energy signal has come to a limiting value. For purposes of this disclosure, the pilot energy threshold $E_{TH}$ and the pilot energy range $E_{RN}$ have been described in relation to particular exemplary embodiments. It should be understood that the pilot energy threshold $E_{TH}$ and the pilot energy range $E_{RN}$ can be selected as required for any particular receiver. Further, it should be understood that the pilot energy threshold $E_{TH}$ and the pilot energy range $E_{RN}$ may be tuned against actual field measurements for an optimized performance.

For purposes of explanation, in the above description, numerous specific details are set forth in order to provide a thorough understanding of the invention. It will be apparent, however, to one skilled in the art that the invention can be practiced without these specific details. In other instances, well-known structures and devices are shown in block diagram form in order to avoid obscuring the invention.

While the invention has been described in conjunction with the specific embodiments thereof, it is evident that many alternatives, modifications, and variations will be apparent to those skilled in the art. Accordingly, embodiments of the invention as set forth herein are intended to be illustrative, not limiting. There are changes that may be made without departing from the spirit and scope of the invention.

What is claimed is:

1. A method of receiving, comprising:
    demodulating a carrier bearing an input signal by a demodulator configured to operate with one of first and second predetermined bandwidths, the demodulator operating with the first predetermined bandwidth;
    extracting a pilot energy signal from the input signal;
    generating a feedback signal based on the pilot energy signal, the feedback signal being fed back to the demodulator; and
    switching from the first predetermined bandwidth to the second predetermined bandwidth for the demodulator to operate with the second predetermined bandwidth based on the feedback signal.

2. The method according to claim 1, further comprising:
    filtering the pilot energy signal to generate a filtered pilot energy signal, wherein the input signal is demodulated over the second bandwidth if the filtered pilot energy signal is within a pilot energy range for a first predetermined amount of time.

3. The method according to claim 1, further comprising:
    demodulating the carrier bearing the input signal over the first predetermined bandwidth if the pilot energy signal is greater than a pilot energy threshold for a predetermined amount of time.

4. The method according to claim 1, wherein the first predetermined bandwidth corresponds to a first Random Maximum System Deviation (RMSD) value of 75 kHz and the second predetermined bandwidth corresponds to a second RMSD value 50 kHz.

5. The method according to claim 1, further comprising:
    decoding the input signal as either a monophonic or stereophonic based on a residual signal that is indicative of a difference between the pilot energy signal and a filtered pilot energy signal.

6. The method of claim 5, further comprising:
comparing the residual signal with a noise energy threshold to generate a channel condition signal; and
outputting either the monophonic or stereophonic signal based on the channel condition signal.

7. The method of claim 6, further comprising:
comparing the pilot energy signal with a pilot energy threshold to generate an energy level signal; and
outputting either the monophonic or stereophonic signal based on the energy level signal.

8. The method according to claim 1, further comprising:
generating a residual signal indicative of a noise level associated with a pilot energy signal;
calculating a residual block energy level of the residual signal over an observation interval;
generating a monitor signal based on a number of times the pilot energy signal is less than a pilot energy threshold during the observation interval; and
switching a mode of the receiver based on the residual block energy level and the monitor signal.

9. The method according to claim 8, further comprising:
designating a portion of the residual signal within the observation interval as either a mono block or a stereo block based on the residual block energy level and the monitor signal.

10. The method according to claim 9, further comprising:
designating the portion as a mono block when the residual block energy level over the observation interval is greater than a residual block energy threshold, or the monitor signal is less than a mode switch threshold; and otherwise, designating the portion as a stereo block.

11. The method according to claim 9, further comprising:
switching the mode of the receiver from a monophonic mode to a stereophonic mode if a predetermined number of consecutive portions of the residual signal are designated as stereo blocks.

12. The method according to claim 9, further comprising:
switching the mode of the receiver from a stereophonic mode to a monophonic mode if a predetermined number of consecutive portions of the residual signal are designated as mono blocks.

13. The method according to claim 8, wherein the residual block energy level is computed by at least one of first and second norm filters.

14. The method according to claim 8, wherein the monitor signal is generated by incrementing a counter every time the pilot energy signal is less than the pilot energy threshold during the observation interval.

15. The method according to claim 8, wherein the residual signal is based on a difference between a pilot energy signal and a filtered pilot energy signal.

16. The method according to claim 15, further comprising:
filtering the pilot energy signal to generate the filtered pilot energy signal by using a filter having a transfer function $H(z)$:

$$H(z) = \frac{\rho}{1 - (1 - \rho)z^{-1}}$$

where $\rho$ is a leakage factor and $z$ is a delay factor.

17. The method according to claim 16, further comprising:
varying the leakage factor between a first value and a second value to minimize a noise level of the filtered pilot energy signal and to reduce a response time of the receiver.

18. The method according to claim 17, wherein the first value is greater than the second value.

19. The method according to claim 18, wherein the first value is $2^{-4}$ and the second value is $2^{-12}$.

* * * * *